United States Patent [19]

Landrigan

[11] 4,018,079
[45] Apr. 19, 1977

[54] METHOD AND APPARATUS FOR TESTING HYDRAULIC RELEASES

[75] Inventor: George E. Landrigan, Lynnfield, Mass.

[73] Assignee: Landrigan Corporation, Boston, Mass.

[22] Filed: June 16, 1975

[21] Appl. No.: 586,988

[52] U.S. Cl. .................................. 73/4 R; 73/37
[51] Int. Cl.² .................. G01L 27/00; G01M 3/02
[58] Field of Search ......... 73/4 R, 37, 168, 432 SD

[56] References Cited

UNITED STATES PATENTS

| | | |
|---|---|---|
| 2,649,750 | 8/1953 | Burgess, Jr. ................. 73/4 R X |
| 2,976,715 | 3/1961 | Roese et al. ................. 73/4 R |
| 3,165,914 | 1/1965 | Schmidt ...................... 73/4 R |
| 3,513,689 | 5/1970 | Nelson ........................ 73/37 |
| 3,667,281 | 6/1972 | Pfeifer ........................ 73/37 |
| 3,677,062 | 7/1972 | King et al. ................... 73/4 R |

Primary Examiner—Charles A. Ruehl
Assistant Examiner—John S. Appleman

[57] ABSTRACT

A method of testing a Hydraulic Release and a test appliance therefor using elevated air pressure.

1 Claim, 8 Drawing Figures

METHOD AND APPARATUS FOR TESTING HYDRAULIC RELEASES

This invention relates to the testing of Hydraulic Releases of the kind used to secure life rafts and the like to ships, the Hydraulic Release being adapted to automatically release the life raft or other object when subjected to selected hydraulic pressure corresponding to submergence to a depth of 5 to 25 feet of water. The purpose of the Hydraulic Release is to ensure that life-saving equipment is available to surviving personnel despite sinking of the ship. Such devices must be tested periodically to assure their proper performance.

According to prior techniques Hydraulic Releases have been tested by submerging them in water which applies hydraulic pressure to the release. The pressure is provided either by a head of water or by use of a pressurized vessel. Such techniques while accurately testing the operability of the Hydraulic Release are objectionable from the point of view of cost and inconvenience of submergence under water and subsequent retrieval from the water.

According to the present invention a new method of testing a Hydraulic Release is provided comprising placing the Hydraulic Release on a test stand and applying tension to it to approximate service conditions, enclosing the thus tensioned Hydraulic Release in a pressure vessel, applying compressed air to the vessel and the Hydraulic Release, gradually increasing pressure while monitoring a pressure gauge sensitive to the pressure within the vessel, detecting the instant of release of the Hydraulic Release in response to the air pressure and noting the reading of the air pressure at the time of such release, only those Hydraulic Releases which release in a predetermined pressure range being accepted. The invention also features a test appliance for a Hydraulic Release comprising an air-tight compressed air vessel, a compressed air system for pressurizing the vessel at gradually increasing air pressure, an air pressure gauge sensitive to the air pressure within the vessel and a test stand adapted to support the Hydraulic Relese under tension approximating service conditions within the pressure vessel and exposed to the air pressure.

These and other objects and features of the invention will be understood from the following detailed description taken in connection with the drawings wherein.

Referring to FIGS. 2, 3, 5 and 6 the Hydraulic Release 8 comprises parts A and B which are interlocked and have eyes 7 and 9 for joining to shackles for applying tension to a line.

Figure 2:
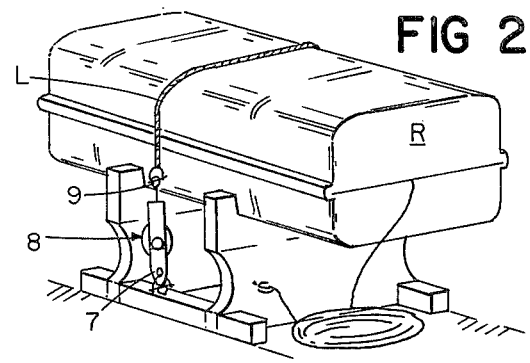
FIG. 2 depicts a Hydraulic Release in its tensioned condition, securing a life raft to the deck of a ship.

Referring to FIG. 2 in an example of use of the Hydraulic Release under service conditions eye 7 is secured to a deck pad and eye 9 is secured to a line L under substantial tension for securing life raft R to the deck of a ship.

Figure 1:
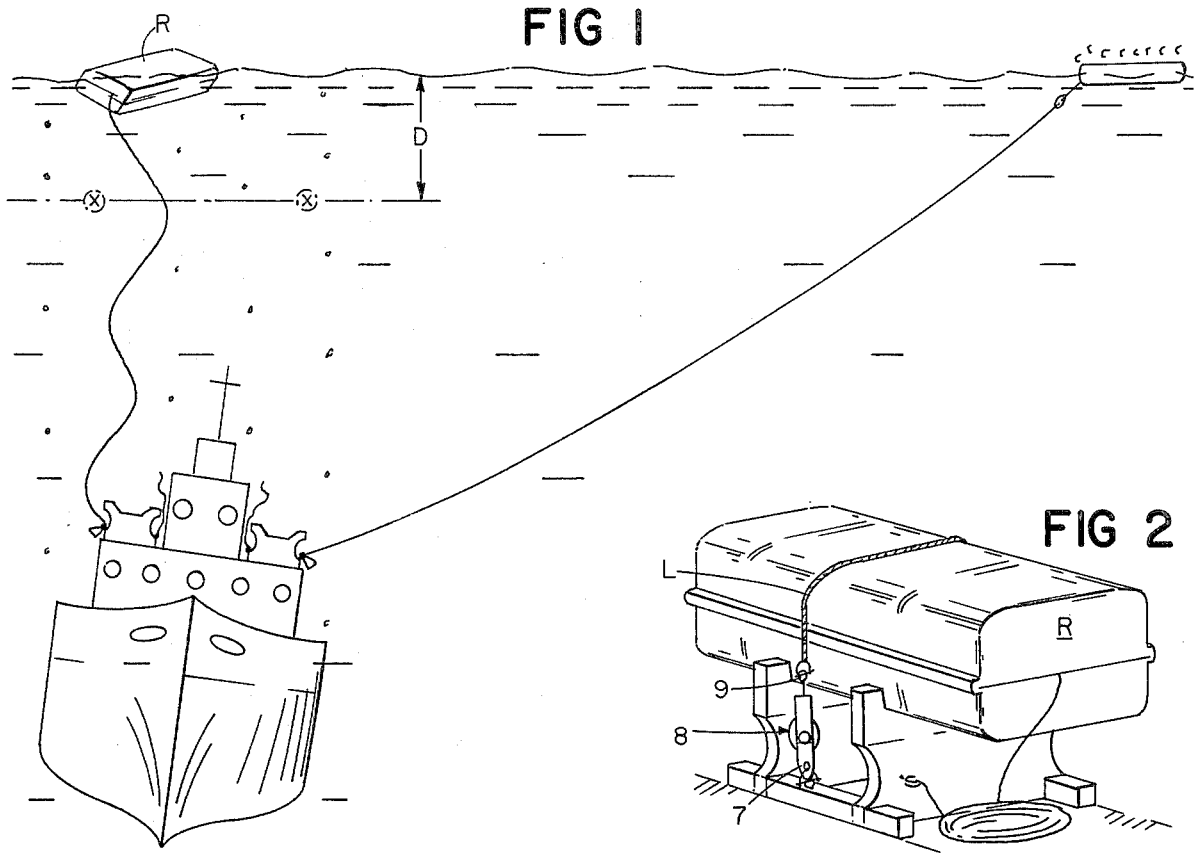
FIG. 1 depicts a sinking ship from which a life raft has been automatically freed by a Hydraulic Release.

Referring to FIG. 1 in the event of sinking of the ship, when the predetermined depth D exceeds the pressure setting of Hydraulic Release 8, hydraulic pressure releases the coupling between parts A and B, thus releasing line L from the life raft and allowing the life raft to float to the surface where it is inflated and available for survivors.

The Hydraulic Releases are of known construction, descriptions being readily available, suffice it to say that one part, B has a diaphragm 11 exposed to hydraulic pressure to overcome spring 13, causing a catch arrangement 15 to be released and allowing the other part, A, to be pulled away as a result of the tension on the assembly.

Figures 3, 4:
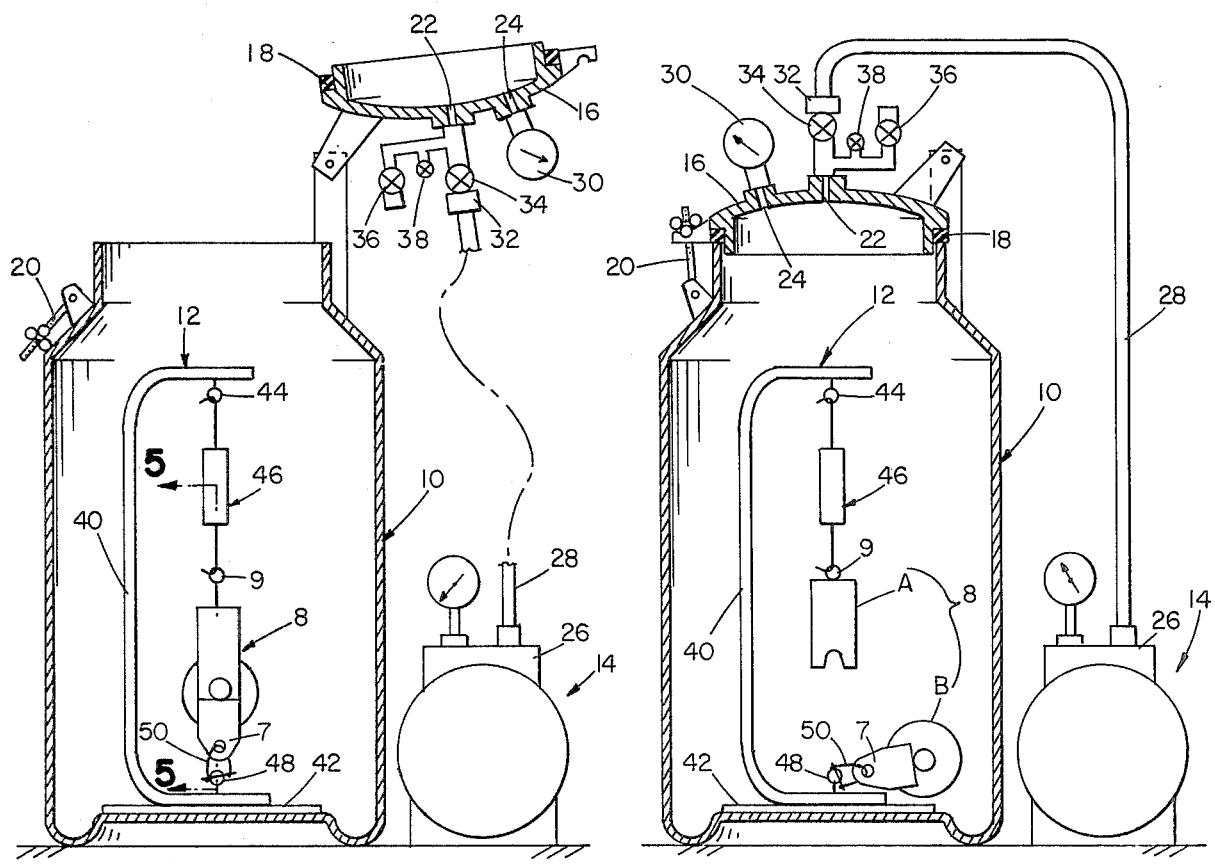
FIG. 3 is a side view of a test appliance according to the invention into which a test stand is inserted.
FIG. 4 is a view similar to FIG. 3 showing the test appliance closed and in the condition at the instant of release of the Hydraulic Release in response to air pressure.

Referring to FIGS. 3 and 4 the test appliance comprises a pressure vessel 10, a tension stand 12 and an air compressor system 14. In a preferred embodiment the pressure vessel is a cylindrical 60-gallon welded steel tank standing approximately 40 inches in height and 25 inches in diameter, with the top of the tank narrowing to an opening 14 inches in diameter. A hinged cast iron top 16 is mounted above the tank top opening and is fitted with a neoprene gasket 18. A series of evenly spaced tumble bolts 20 with washers and wing nuts provide the means for securing the tank top cover, using a wing nut wrench to insure sufficient pressure on the wing nuts to make the tank air-tight, under design pressure.

The tank cover 16 has two openings: intake opening 22, and pressure gauge opening 24. The tank is pressurized by use of an air compressor 26 with a hose 28 connected to a manifold at the intake opening. Air pressure gauge 30 which reads in tenths of a psi from 0-15 psi is mounted at the pressure gauge opening 24. The manifold at the intake opening is fitted with a quick connect device 32, an air cock valve 34, a decompression valve 36 and a safety valve 38 set at 14 psi.

The tension stand 12 consists of a bowed pipe 40 mounted on a circular base 42, overall length being 27 inches, with diameter of the base measuring 12 inches. The bowed pipe is drilled at the top and bottom, at the top to accommodate an eye bolt 44 which supports double hooked turnbuckle 46, and at the bottom to accommodate an eye bolt 48 to which shackle 50 is attached. Size and strength of shackle are sufficient to enable spring tension on the Hydraulic Release 8 to be set equivalent to in-service use.

In a preferred embodiment the following detailed procedures are followed in using the Test Appliance.

A. Examine each Hydraulic Release to be tested to ensure that all working parts are free of grit, soot or other like materials.

Figure 6:
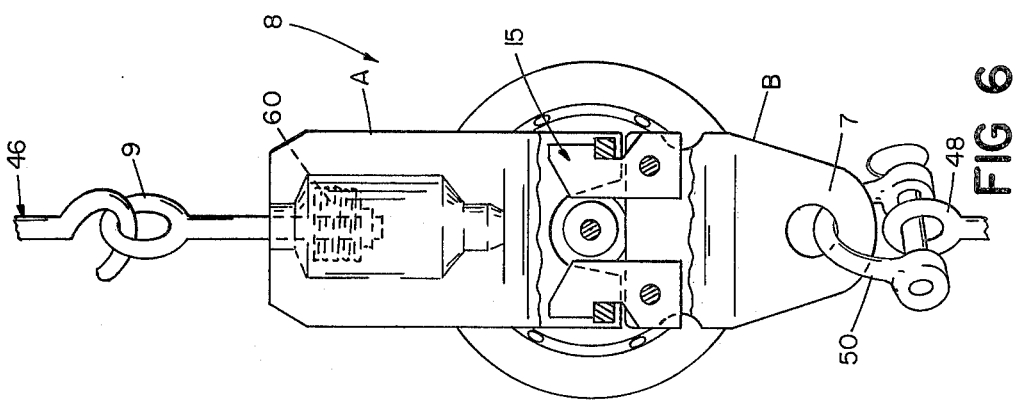
FIG. 6 is a face view of the Hydraulic Release of FIG. 5.
Figure 5:
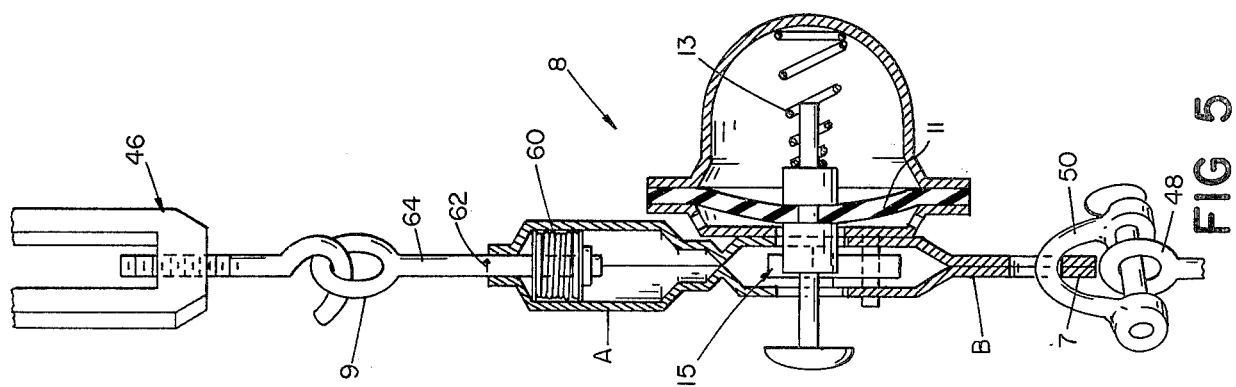
FIG. 5 is a vertical cross-sectional view of the Hydraulic Release taken on line 5–5 of FIG. 3.

B. Mount the Hydraulic Release 8 to be tested on the tension mounting stand 12 as shown in FIGS. 3, 5 and 6 and adjust the setting of compression spring 60, by turning turnbuckle 46 to set it equivalent to in-service use, noted by the position of spring setting mark 62 on shaft 64 of the Release.

C. Place tension stand 12 with mounted Hydraulic Release 8 in the bottom of the tank so that it is positioned vertically.

D. Secure tank top 16 firmly by bolts 20, connect pressure hose 28 to intake manifold quick connect fitting 32, close intake pet cock 34 on intake manifold and close decompression valve 36.

Figure 8:
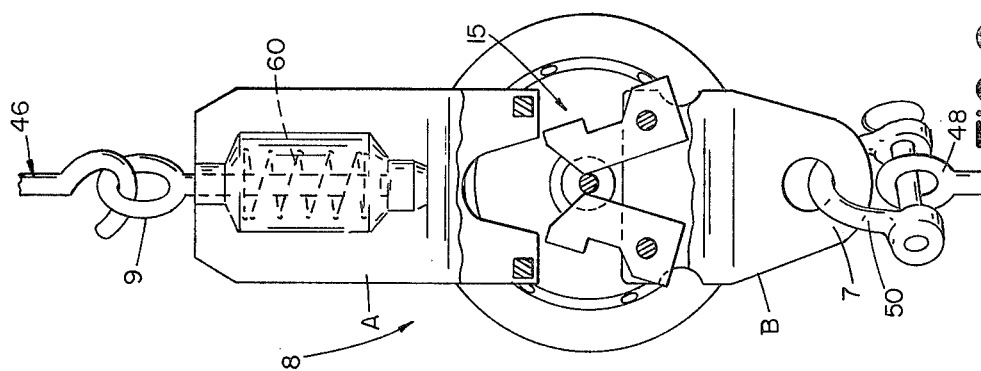
FIGS. 7 and 8 are views similar to FIGS. 5 and 6, respectively, of the Hydraulic Release at the instant it is released in response to air pressure.
Figure 7:
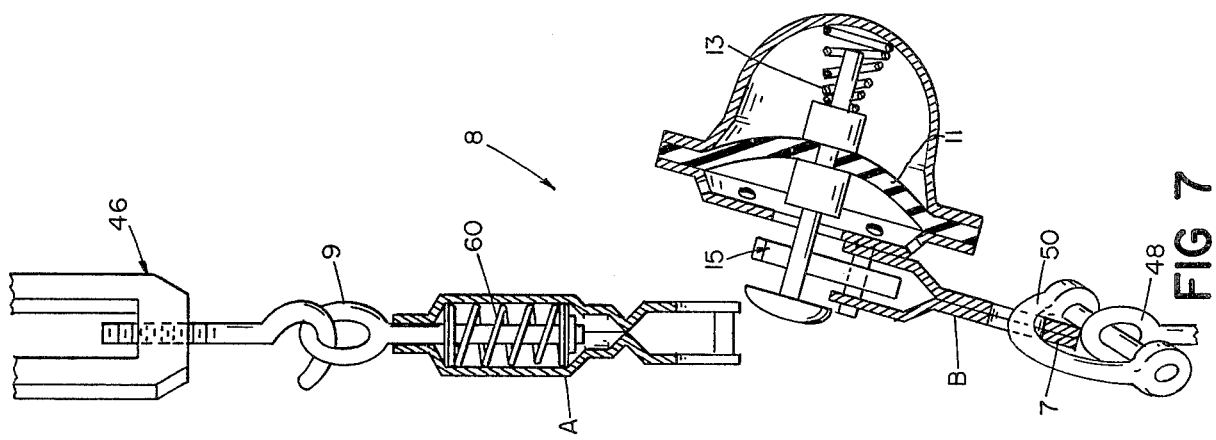

E. Start air compressor, open intake pet cock 34 and continue to pressurize tank while monitoring the pressure gauge 30 until the Hydraulic Release 8 parts as shown in FIGS. 4, 7 and 8. This will be indicated by a distinct sound which accompanies release and separation of the Hydraulic Release 8. At this moment the operator notes the air pressure at the time of parting and records it.

F. Stop pressurizing tank 10, shut intake pet cock 34, open decompression valve 36 and bleed tank of all air until pressure gauge reads zero.

G. Release bolts 20, open the tank and retrieve tension stand and separated Hydraulic Release parts and have the witnessing U.S.C.G. Marine Inspector initial and date the record plate attached to the Hydraulic Release and record the test, with the air pressure as noted.

H. Any Hydraulic Release parting before the air pressure reaches 2.15 psi, which is the equivalent of 5 feet of hydrostatic pressure, or after the air pressure exceeds 10.75 psi, the equivalent of 25 feet of hydrostatic pressure, shall be considered as having failed the test and be rejected and withdrawn from services.

What is claimed is:

1. A method of testing a marine Hydraulic Release of the type used to secure life rafts and the like to ships comprising placing the Hydraulic Release on a test stand and applying tension to it to approximate service conditions, enclosing the thus tensioned Hydraulic Release in a superatmospheric pressure vessel, applying compressed air to the interior of the closed vessel in a manner to subject the Hydraulic Release directly to air under superatmospheric pressure, gradually increasing superatmospheric air pressure simulating corresponding hydraulic pressure related to submergence of the device below the surface of the sea while monitoring an air pressure gauge sensitive to the superatmospheric pressure within the vessel, detecting the instant of release of the Hydraulic Release in response to the directly contacting superatmospheric air pressure and noting the reading of said air pressure gauge at the time of such release, only those Hydraulic Releases which release in a predetermined superatmospheric air pressure range being accepted.

* * * * *